(12) United States Patent
Buettner

(10) Patent No.: US 12,047,693 B2
(45) Date of Patent: *Jul. 23, 2024

(54) IMAGE PROCESSING SYSTEM AND FILTER ARRAY INCLUDING WIDEBAND FILTER ELEMENTS AND NARROWBAND FILTER ELEMENTS

(71) Applicant: Blackmagic Design Pty Ltd, Port Melbourne (AU)

(72) Inventor: Carsten Buettner, Port Melbourne (AU)

(73) Assignee: Blackmagic Design Pty Ltd, South Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,964

(22) Filed: Apr. 14, 2023

(65) Prior Publication Data

US 2023/0254597 A1 Aug. 10, 2023

Related U.S. Application Data

(63) Continuation of application No. 17/574,841, filed on Jan. 13, 2022, now Pat. No. 11,632,525, which is a
(Continued)

(30) Foreign Application Priority Data

Mar. 28, 2018 (AU) ................. 2018901038

(51) Int. Cl.
*H04N 25/13* (2023.01)
*H04N 25/133* (2023.01)
(Continued)

(52) U.S. Cl.
CPC ........... *H04N 25/13* (2023.01); *H04N 25/133* (2023.01); *H04N 25/50* (2023.01); *H04N 25/44* (2023.01)

(58) Field of Classification Search
CPC ...... H04N 25/13; H04N 25/133; H04N 25/50; H04N 25/44; H04N 23/54; H04N 25/71;
(Continued)

(56) References Cited

U.S. PATENT DOCUMENTS

| 4,646,139 A | 2/1987 | Takei et al. |
| 5,323,233 A | 6/1994 | Yamagami et al. |

(Continued)

FOREIGN PATENT DOCUMENTS

| EP | 0 472 299 A1 | 2/1992 |
| EP | 1 241 896 A2 | 9/2002 |

(Continued)

OTHER PUBLICATIONS

Extended European Search Report for EP Application No. 19165458.1 dated Aug. 7, 2019, 8 pages.

(Continued)

*Primary Examiner* — Luong T Nguyen
(74) *Attorney, Agent, or Firm* — Seed IP Law Group LLP

(57) ABSTRACT

The disclosure relates to a filter array and to a method for processing image data in a camera. The camera is configured to receive light and generate image data using an image sensor having an associated filter array. The image sensor includes an array of pixels, each of which corresponds to a filter element in the filter array, so that each pixel has a spectral response at least partly defined by a corresponding filter element. The filter array includes a pattern of wideband filter elements and at least two types of narrowband filter elements. The method includes the step of generating a luminance image comprising a wideband filter element value that is calculated for each pixel of the image sensor.

29 Claims, 6 Drawing Sheets

Related U.S. Application Data continuation of application No. 16/368,593, filed on Mar. 28, 2019, now Pat. No. 11,258,992.

(51) Int. Cl.
 *H04N 25/44* (2023.01)
 *H04N 25/50* (2023.01)

(58) Field of Classification Search
 CPC .............. H04N 25/76; H01L 27/14601; H01L 27/14621; H01L 27/14645; H01L 27/14806
 See application file for complete search history.

(56) References Cited

U.S. PATENT DOCUMENTS

| | | | |
|---|---|---|---|
| 6,476,865 B1 | 11/2002 | Gindele et al. | |
| 7,663,679 B2 | 2/2010 | Wada | |
| 7,769,230 B2 * | 8/2010 | Pillman | H04N 25/135 382/152 |
| 8,031,243 B2 * | 10/2011 | Imai | H04N 23/843 348/278 |
| 8,125,543 B2 | 2/2012 | Cho | |
| 8,274,715 B2 | 9/2012 | Hamilton, Jr. et al. | |
| 8,711,452 B2 | 4/2014 | Hamilton, Jr. et al. | |
| 11,258,992 B2 * | 2/2022 | Buettner | H04N 25/133 |
| 11,632,525 B2 * | 4/2023 | Buettner | H04N 25/133 348/324 |
| 2005/0099504 A1 | 5/2005 | Nayar et al. | |
| 2007/0024934 A1 | 2/2007 | Andams et al. | |
| 2007/0206104 A1 | 9/2007 | Wada | |
| 2010/0141812 A1 | 6/2010 | Hirota | |
| 2010/0232692 A1 | 9/2010 | Kumar et al. | |
| 2010/0302423 A1 | 12/2010 | Adams, Jr. et al. | |
| 2011/0012011 A1 | 1/2011 | Jung et al. | |
| 2016/0234467 A1 | 8/2016 | Wu et al. | |
| 2018/0040104 A1 | 2/2018 | Lukac | |
| 2018/0075588 A1 * | 3/2018 | Hosoda | H04N 25/134 |

FOREIGN PATENT DOCUMENTS

| | | |
|---|---|---|
| EP | 3 416 128 A1 | 12/2018 |
| JP | 2004-304706 A | 10/2004 |
| JP | 2007-243334 A | 9/2007 |
| JP | 2008-219598 A | 9/2008 |
| WO | 2008/066698 A2 | 6/2008 |

OTHER PUBLICATIONS

Japanese Office Action for JP Patent Application No. 2019-050753 dated Mar. 7, 2023, 9 pages.

\* cited by examiner (CFA)

IMAGE PROCESSING SYSTEM AND FILTER ARRAY INCLUDING WIDEBAND FILTER ELEMENTS AND NARROWBAND FILTER ELEMENTS

BACKGROUND

Technical Field

The present disclosure relates to an image processing method, and in particular to a method for processing raw image data obtained from an image sensor with a filter array. The present disclosure also relates to a filter array.

Description of the Related Art

Digital color cameras capture color images of real-life scenes electronically using an image sensor, usually a charge-coupled device (CCD) or a complementary metal oxide semiconductor sensor (CMOS). Due to the monochromatic nature of the image sensor, digital camera manufacturers implement various solutions to capture the color nature of the scene. These solutions include using a three-sensor device which uses one sensor per color channel; using vertically color-sensitive photosites; or most commonly, using single-sensor device with a color filter array. A single-sensor device represents one of the most cost-effective methods currently in use for color imaging and is widely utilized in digital cameras.

In a single-sensor camera, a color filter array (CFA), which is essentially a spatial array of color filters, is typically placed in front of a single image sensor to capture different spectral components (colors) at the same time. The filters of the CFA are spatially correlated with photosites of the single image sensor, so that each photosite has a corresponding spectrally selective filter. A raw image captured by a single-sensor camera generally constitutes a mosaic-like grey-scale image with only one color element at each photosite. The raw image is then subject to a series of image processing steps to generate an image that realistically represents the true visual scene captured.

The most common type of CFA used is a Bayer CFA with alternating red, green and blue color filters as shown in FIG. 1. As there is only one color type captured at each photosite, the raw image captured is a "mosaic" of red, green, and blue values, each at a different photosite. A process known as "demosaicing" is used to generate full color information for each photosite. In this process, the missing color information of a photosite is determined from neighboring photosites by an interpolation process. When such tri-chromatic image acquisition is used on a sensor with a Bayer CFA, the amount of raw image data is increased by a factor of three by this demosaicing process. Further processing such as white balancing, color transformation, noise reduction, tone mapping may also be required. These processing steps can be performed as follows:

(1) Carried out before the camera stores the image, so that the stored image is ready to be viewed at any time on a display by a user. Most consumer camera applications choose to process raw image data before it is stored as immediate viewing of captured images or videos is often highly desired.

(2) The camera may delay some such image processing steps mentioned above until post-processing. This can include storing RAW data in a suitable format on the camera. Such an approach is more common for professional camera applications. Both options have their own advantages and disadvantages.

There are also various proposals for constructing an image sensor with a CFA having a combination of single-color-elements (e.g., R, G, B) and wideband (white) filter elements. Such an image sensor provides color information through the narrowband-filtered RGB photosites, as well as using the spectrally-wideband (wideband/white) photosites to improve sensitivity. These constructions involve techniques such as replacing some of the narrowband photosites with wideband photosites, generally reducing the relative number of RGB photosites, and often significantly increasing the total number of photosites (which requires a corresponding reduction in photosite size). As for the actual layout of the RGB and white photosites, some approaches maintain the RGB filters in a Bayer arrangement to capture lower resolution color information alongside the higher resolution wideband (white) image data.

An example of a CFA that uses both color and wideband filter elements is shown in FIG. 4.

Various algorithms are known for demosaicing the pixel values captured at the photosites of combined color/wideband image sensors. For example, JP2004304706A describes a simple interpolation approach to derive luminance and color with simple coefficient sets. However, the approach involves different filter kernel sizes which may very well lead to different low-pass filter characteristics for different pixel locations (G vs W vs R/B). The approach shown in U.S. Pat. Nos. 8,274,715, 8,711,452, and US2011/0012011 involves only a fairly sparse color sampling due to the use of dual color pixels in each cell.

The present disclosure aims to provide a method for processing image data captured at the photosites, and devices for capturing image data using a combined color/wideband image color filter array.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY

According to a first aspect of the present disclosure, there is provided a method for processing image data in a camera, said camera being configured to receive light and generate image data using an image sensor having an associated filter array, said image sensor including an array of pixels, each of which correspond to a filter element in the filter array, so that the pixel has a spectral response at least partly defined by a corresponding filter element; wherein the filter array includes a pattern of wideband filter elements and at least two types of narrowband filter elements; the method including generating a luminance image comprising a wideband filter element value for each pixel of the image sensor.

Typically, a wideband filter element value is calculated by applying a filter kernel to a pixel of the image sensor. The filter kernel is preferably such that it calculates a wideband filter element value for a pixel using only pixels corresponding to wideband filter elements.

The filter kernel may calculate a wideband filter element value for a pixel by combining pixels corresponding to wideband filter elements that are diagonally adjacent to the pixel.

A different filter kernel may be applied to a pixel depending on whether the pixel corresponds to a wideband filter element or to a narrowband filter element.

According to one embodiment, the filter kernel is, or approximates, a 2-dimensional Gaussian type filter.

The method may include the step of generating a second luminance image comprising a narrowband filter element value for each pixel of the image sensor, the narrowband filter element values calculated using only pixels corresponding to narrowband filter elements.

The method may include the step of combining the luminance image with the second luminance image.

Optionally, the method includes the step of generating a third luminance image comprising a wideband filter element value for each pixel of the image sensor, the wideband filter element values calculated using only pixels corresponding to narrowband filter elements.

Preferably, the filter array includes three types of narrowband filter elements.

According to an embodiment, the array of pixels includes an equal density of pixels corresponding to each of the three types of narrowband filter elements.

The filter array may be arranged so that the spectral response of the luminance image has a profile that substantially matches the profile of the spectral response of the second luminance image.

According to another aspect of the present disclosure, there is provided a method for processing image data in a camera, said camera being configured to receive light and generate image data using an image sensor having and an associated filter array, said image sensor including an array of pixels, each of which correspond to a filter element in the filter array, so that the pixel has a spectral response at least partly defined by the corresponding filter element; wherein the filter array includes a pattern of wideband filter elements and at least two types of narrowband filter elements; the method including generating a wideband luminance image on the basis of the output of pixels corresponding to the wideband filter elements.

Preferably the filter array is arranged so that the spectral response of the wideband pixels is substantially the same as the spectral response of the narrowband filter elements.

Preferably the filter array includes three types of narrowband filter elements, e.g., type 1, type 2 and type 3. Each can have a passband centered on a different wavelength. The narrowband filter elements may not strictly be bandpass filters, but may be cut-off filters which, because of the presence of other filters have the effect of defining a passband for their corresponding pixel(s) in the array.

Preferably the array of pixels includes an equal density of pixels corresponding to each of the three types of narrowband filter elements.

The method can further include generating a narrowband luminance image on the basis of the output of the pixels corresponding to the narrowband filter elements.

The narrowband luminance image is preferably calculated directly from the output of the pixels corresponding to the narrowband filter elements. In a preferred form, the narrowband luminance image is not derived from pixel values of a color plane image.

The pixel values comprising the narrowband luminance image are preferably derived from the output of pixels corresponding to the narrowband filter elements and one or more filter kernels.

The method preferably includes generating a wideband luminance image on the basis of the output of pixels corresponding to the wideband filter elements and one or more filter kernels.

The same filter kernels may be used to compute the wideband luminance image and a narrowband luminance image.

The present disclosure, at least in preferred embodiments, involves the computation of a high-spectral-response luminance image from wideband pixel values of a combined narrowband/wideband image sensor. In doing so, the image sensor's light-response range can be extended. In turn, an image sensor with an extended light-response range allows for higher sensitivity and better high-speed image capture.

Luminance images generated using the present disclosure can be beneficially used in downstream demosaicing and post-processing operations such as those described in the Applicant's pending European patent application, published as EP 3416128, the contents of which are incorporated by reference.

Some embodiments of the present disclosure include a CFA which can advantageously be operated in binning mode. In these embodiments, the unit cell of the CFA includes macro cells which include a pair of wideband filter elements and a pair of narrowband filter elements of the same type. Typically this involves arranging the pairs of pixels along a diagonal of the macro cell. Embodiments such as these can have the benefit of higher sensitivity and faster readout.

In embodiments that can operate in binning mode, the relative density of pixel types may have a 1:1:1 ratio between the three narrowband filtered pixel types and also the same sensitivity ratio between the narrowband and wideband pixel pairs.

In binning mode, the readout of each pair of pixels is read out together and the pixel values combined. Thus the sensitivity of each binned pixel pair is higher than the sensitivity of each individual pixel of the same type. Advantageously since only half the total number of pixel responses needs to be read out from the image sensor, it is possible to achieve double the frame rate while maintaining the same field of view compared to full readout mode of all individual pixels. The disadvantage of operating in the binning mode, however, is reduced spatial resolution.

Typically, the luminance image is computed using an estimation of the wideband content at the photosite of each color pixel. These estimates can be calculated by interpolating from one or more neighboring wideband pixel values.

Optionally, the method can involve the step of computing a full resolution color image in parallel with the luminance image. A low-pass-filtered wideband image can also be calculated from subsets of the pixel values.

According to another aspect of the present disclosure, there is provided a filter array for an imaging sensor comprising a two-dimensional array of filters elements including one or more repeating unit cells comprising three types of narrowband filter elements and wideband filter elements, wherein the density of each type of narrowband filter element is equal.

The filter array may include the same number of wideband filter elements and narrowband filter elements. Preferably the unit cell of the filter array includes the following filter elements:

T1wT2wT3w, wT1wT2wT3, T2wT3wT1w, wT2wT3wT1, T3wT1wT2w, and wT3wT1wT2, wherein 'T1' corresponds to a type 1 narrowband filter element, 'w' corresponds to a wideband filter, 'T2' corresponds to a type 2 narrowband filter element and 'T3' corresponds to a type 3 narrowband filter element.

A preferred form of the type 1 filter can be a red filter. A preferred form of the type 2 filter can be a green filter. A preferred form of the type 3 filter can be a blue filter. The wideband filter can represent an unfiltered pixel, a neutral density filter, or other filter that has a wide passband compared to the type 1, type 2, and type 3 filters.

The methods above are preferably performed using an embodiment of a filter array described herein. As used herein, except where the context requires otherwise, the term "comprise" and variations of the term, such as "comprising", "comprises" and "comprised", are not intended to exclude further additives, components, integers, or steps.

Further aspects of the present disclosure and further embodiments of the aspects described in the preceding paragraphs will become apparent from the following description, given by way of example and with reference to the accompanying drawings.

BRIEF DESCRIPTION OF THE SEVERAL VIEWS OF THE DRAWINGS

An embodiment of the present disclosure will now be described by reference to the following drawings, in which.

DETAILED DESCRIPTION

Embodiments of the present disclosure will now be described with reference to specific examples, but the scope of the disclosure should not be considered as being limited to such examples. For example, the illustrative embodiment will be described in the context of a camera using a single sensor with a color filter array having red, green and blue filtered pixels, and unfiltered (white) pixels. However, embodiments of the present disclosure could be applied for use with a combination of other narrowband filters and wideband filters including neutral density filters within the array.

Figures 1, 2:
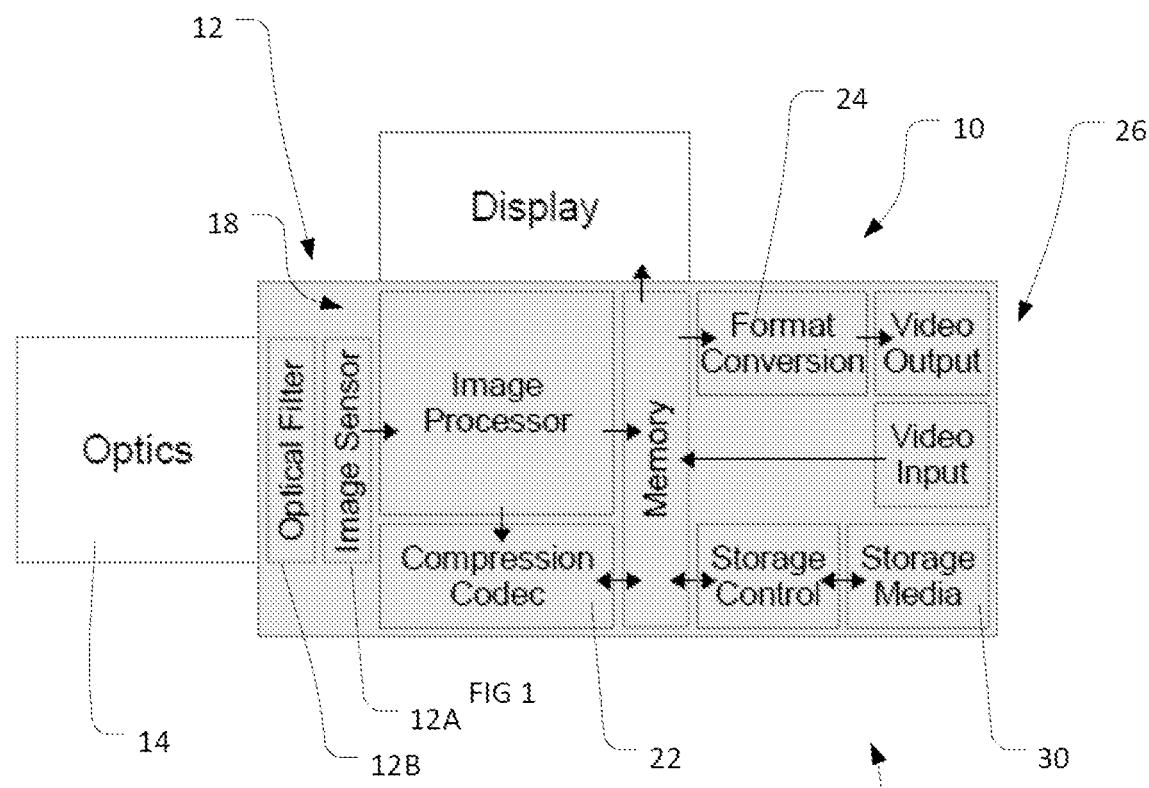
FIG. 1 is an illustration of a Bayer color filter array (CFA)
FIG. 2 is a schematic block diagram of a camera able to implement a method as described herein.

FIG. 2 is a schematic representation of a camera 10 capable of implementing a method according to the present disclosure. The camera 10 includes an image capture system 12 configured to convert received light into raw image data. In this example, the image capture system 12 includes an image sensor 12A (e.g., a CCD or CMOS image sensing chip or similar) and an associated optical filter 12B (e.g., an IR cut-off filter or an optical low pass filter). An optical system 14, e.g., lens is also provided to form images on the image sensor. The image sensor includes a color filter array (CFA), in the form of a spatial array of filters, placed in front of the image sensor chip to enable capture of images made up of separately selective pixels at different positions from which a color image can be generated. The filters of the CFA are spatially correlated with photosites of the single image sensor, so that each photosite has a corresponding spectrally selective filter.

The sensor raw video data that is generated by the image capture system 12 is passed to the image processing subsystem 18. The image processing subsystem 18 may comprise one or more data processors, such as an ASIC or FPGA or microprocessor with associated software, and is configured to perform a range of image processing tasks. These tasks can include but are not limited to: correction of unwanted optical effects such as pincushion distortion or others, demosaicing, noise reduction, correction of pixel-to-pixel variations in captured video data, e.g., by removing dead pixels and correcting for conversion efficiency variations. Working memory 20 is provided to enable temporary storage of data or software or the like during image processing and or image compression and other tasks.

The image processing subsystem 18 also includes a video encoding system 22. The video encoding system 22 will typically be implemented by providing software configured to enable a processor to implement one or more video codecs. This system can be used to encode and optionally compress the video data into a desired format.

The image processing subsystem 18 may also include a format conversion system 24 which processes video output data into a format that is able to be transmitted over a video transmission system 26. The video transmission system 26 is generally configured to only transmit video data which complies with one or possibly several video transmission protocols. The format conversion system 24 is provided to format the video data into one of said video transmission formats to enable transmission, before being passed to the video transmission system 26. This can include transcoding video data from its original format into (one of) an appropriate video transmission format of the video transmission system 26.

The video transmission system is operable to transmit (and optionally receive) video output data via a video interface having at least a video output port. The video interface can be bi-directional and thus also include a video input port. As an example, the video interface could be an SDI interface or other like interface.

The camera also includes a data storage system in the form of a memory control subsystem 28 which is configured to control persistent storage of video data (and any other data) on a local non-volatile memory 30. The local memory 30 may use a removable memory such as a memory card or removable hard drive. However, in the general case, the memory control subsystem 28 is arranged to transmit and/or receive control signals to/from the local memory 30 to control storage and retrieval of video data on the memory 30 and also to perform any encoding or formatting of data for storage. The memory 30 could be a solid-state drive operating according to the Serial ATA protocol, in which case the memory control subsystem will operate to control operation of the SATA drive and manage reading and writing of data to it.

Figure 4:
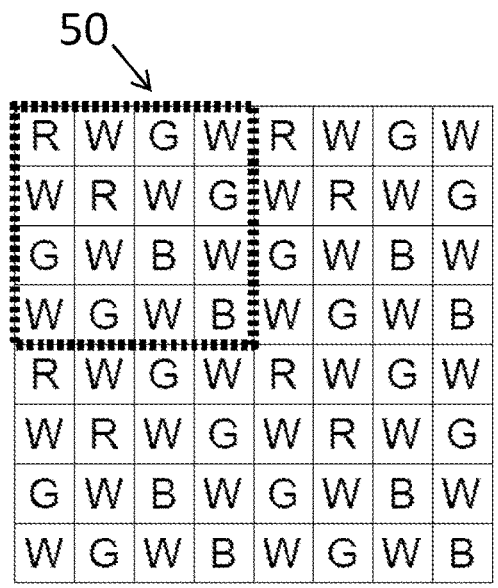
FIG. 4 is an illustration of a known RGBW CFA pattern with associated sensitivity graphs. In this figure, and those that follow, the dotted box delineates a repeating 'unit cell' that is applied on an image sensor to cover the multiplicity of photosites contained in it.
Figure 4:
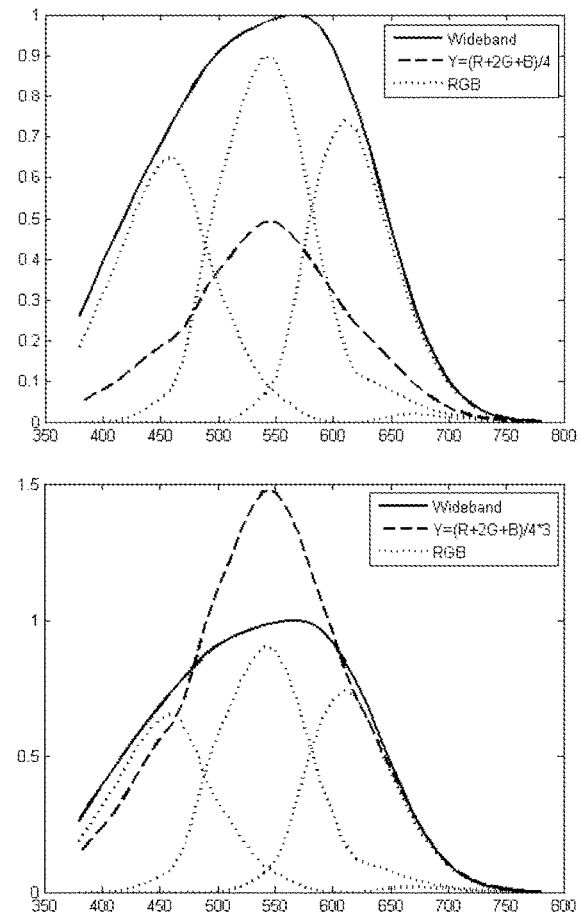
Figure 5:
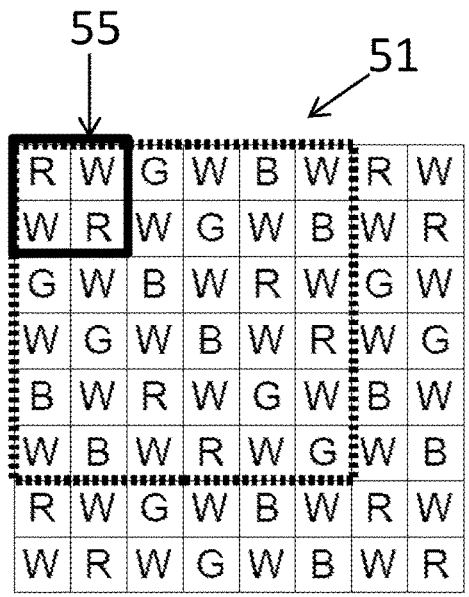
FIG. 5 illustrates a filter array in accordance with an embodiment of the present disclosure with associated sensitivity graphs.
Figure 5:
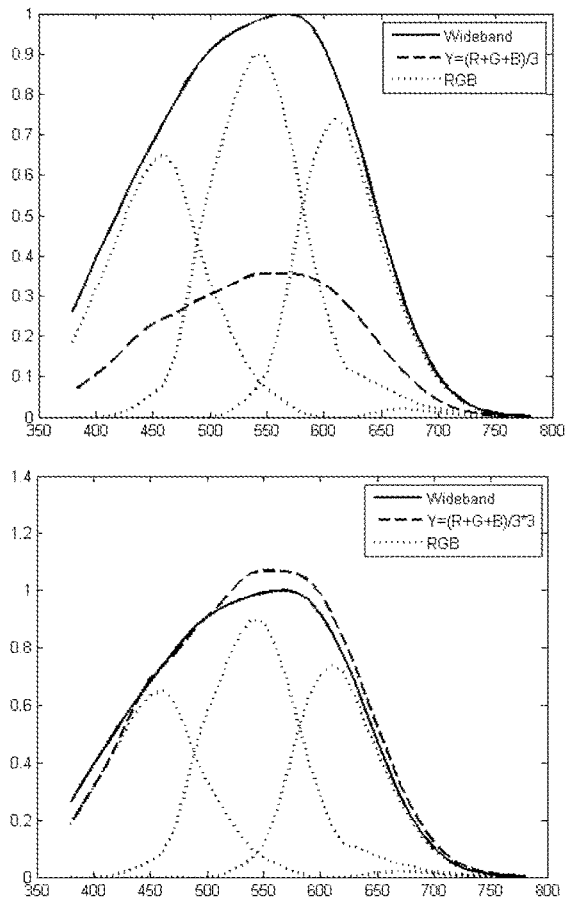
Figure 6:
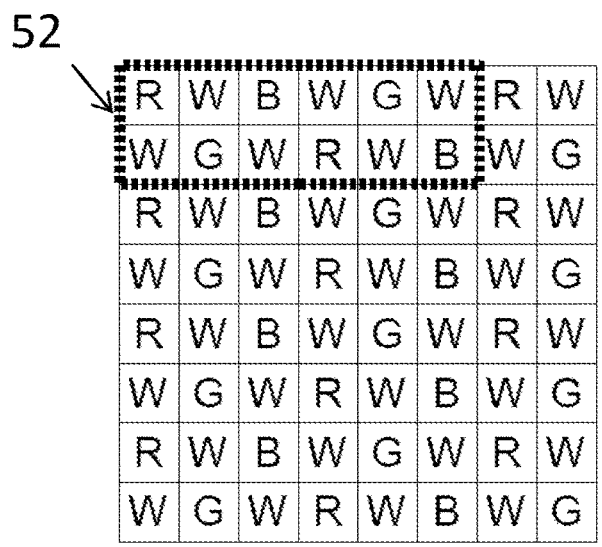
FIG. 6 illustrates a second filter array in accordance with an embodiment of the present invention.

Example filter arrays 50, 51, 52 suitable for use with the camera of FIG. 2 are illustrated in FIGS. 4 to 6. Each filter array 50, 51, 52 includes a combination of narrowband filters of three types, (type 1, type 2 & type 3). Each type of filter has a specific passband. In these examples, each filter type has a passband centered on a specific color and hence is referred to by reference to that color. For example, a filter element with a passband centered on a red wavelength is termed a "Red" pixel and is represented with an "R" in the figures. A Blue pixel, centered on a blue wavelength is denoted by a "B" in the figures, and a Green pixel, centered on a green wavelength is denoted by a "G". The present CFAs also include a wideband filtered pixel, which is denoted by a "W" in the figures.

Figure 3:
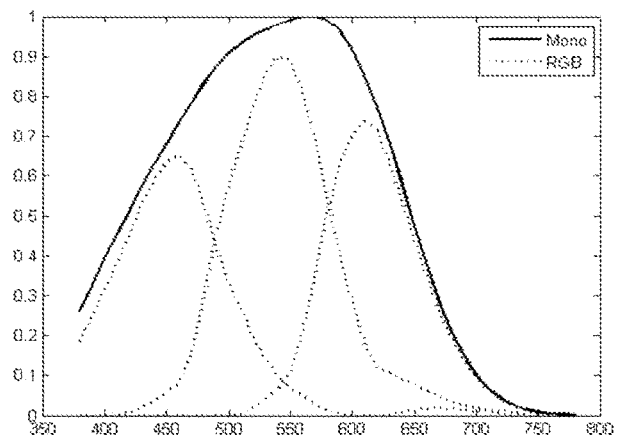
FIG. 3 is a graph illustrating typical spectral sensitivities of a CFA and wideband-variant image sensor.

FIG. 3 (and the plots in FIGS. 4 and 5) shows the sensitivity of an image sensor at different wavelengths when each of the filter element types of the present examples are applied to it. The plots assume that an infra-red cut-off filter is also present. As will be appreciated, the response of the image sensor illustrated is thus a combination of the response of the sensor's pixels as well as the filtering effect of the filter element of the CFA, and possibly other filter elements such as an IR cut-off filter. As can be seen, the peak response for pixels corresponding to a wideband filter is centered about the combined spectral response of the pixels with R, G, B filters. The response curve of the wideband pixel is "wider" than the combined response of all three narrowband filters.

As will be discussed in detail below, the filter array 51 of FIG. 5 is a two-dimensional array or color and wideband filters arranged in a 6×6 pixel pattern (unit cell) that repeats over the whole filter array. FIG. 4 shows another example of a color filter array comprising three narrowband filters and a wideband filter arranged in a 4×4 unit cell. As in the previous examples, the narrowband filters are labelled "R", "G", "B", and represent filters with passbands centered on red, green, and blue, respectively. The "W" pixels are wideband pixels with a passband as illustrated in FIG. 3.

FIG. 6 shows a further color filter array 52, which differs from the previous embodiments in that its "unit cell" is 6×2 pixels.

As can be seen in the color filter arrays of FIGS. 4, 5, and 6, each has a different arrangement of RGBW pixels.

The prior art color filter array (CFA) shown in FIG. 4 is based on keeping the color filters RGB in a typical Bayer-type pattern and at a lower resolution. Such an arrangement achieves a 1:2:1 sampling ratio between RGB pixels and is typical for a RGB Bayer array having 1 red, 2 green, and 1 blue pixels per "unit cell", or as shown in FIG. 4, 2 red, 4 green, and 2 blue pixels.

FIG. 4 also illustrates a plot comparing the sensitivity of the red, green, and blue pixels arranged according to the CFA of FIG. 4 to its wideband pixels. The top plot shows the individual sensitivity of the R, G, and B pixels in dotted lines. The sensitivity of the wideband pixels is shown by the solid line. In this top plot, all values are normalized to the peak sensitivity of the wideband pixels to aid comparison.

The dashed line in FIG. 4 illustrates the spectral sensitivity of a luminance value Y computed from the R, G, and B pixels of the unit cell 50 of FIG. 4. Y is calculated as $Y=(R+2G+B)/4$. This value represents the luminance sensitivity at a single photosite in the image sensor of FIG. 4. Further details of how this computation can be performed are discussed in relation to FIG. 7. Importantly, it can be seen from this normalized value that the wideband pixels are more sensitive than the narrowband-derived values.

In the lower plot of FIG. 4, the Y value from the R, G, and B pixels is scaled up (by a factor of 3) to aid comparison of its spectral response to that of the wideband pixels. As can be seen, the sensitivity of the Y value tracks the W value well at longer wavelengths (e.g., above 620 nm) but has a much more pronounced peak around the central frequency of the green filter. This is primarily due to the double density of green pixels in the CFA of FIG. 4.

As will be described below, this mismatch in sensitivity between the narrowband pixels and wideband pixels has implications for the calculation of luminance images when using a CFA of FIG. 4.

Turning now to FIG. 5, it can be seen that the "unit cell" of CFA of FIG. 5 is a 6×6 matrix of RGBW pixels.

The filter array 51 has, in comparison to that shown in FIG. 4, an increased density of red and blue color photosites, with a reduced number of green photosites. While the array 50 shown in FIG. 4 consists of only 12.5% red and 12.5% blue pixels, filter array 51 of FIG. 5 increases these color photosites to 16.7% each red and blue pixels. Filter array 51 also has 16.7% green photosites. This enables full color information to be derived from the CFA. However, since the sensitivity as well as the resolution of fine image details is achieved by the wideband pixels in all these RGBW arrays, the green pixels can be reduced without any major disadvantage.

Another benefit resides in the CFA of FIG. 5 in that the 1:1:1 sampling of red, green, and blue colored photosites can be seen in the sensitivity plots. In FIG. 5, the top plot shows the individual sensitivity of the R, G, and B pixels in dotted lines. The sensitivity of the wideband pixels is shown by the solid line. Again, all values are normalized to the peak sensitivity of the wideband pixels to aid comparison.

The dashed line in FIG. 5 illustrates the spectral sensitivity of a luminance value Y computed from the R, G, and B pixels of the unit cell 51 of FIG. 5. Y is calculated as $Y=(R+G+B)/3$. This value represents the luminance sensitivity at a single photosite in the image sensor of FIG. 5. Further details of how this computation can be performed are discussed in relation to FIG. 8. Importantly, it can be seen from this normalized value that the wideband pixels are more sensitive than the narrowband derived values.

Again, the bottom plot scales the Y value from the R, G, and B pixels by a factor of 3 to aid comparison of its spectral response to that of the wideband pixels. As can be seen, the sensitivity of the Y value closely tracks that of the W value over the entire wideband filter passband. The advantage of this close matching will be discussed below.

A further advantage of the embodiments of FIG. 5 is that it can be operated in binning mode, which can advantageously increase sensitivity and readout speed. As can be seen in FIG. 5, the unit cell 51 of the CFA of FIG. 5 can be divided into macro-cells which include a pair of wideband filter elements (W) and a pair of narrowband filter elements of the same type. A macropixel indicated by reference numeral 55 contains a pair of red narrowband filter elements and a pair of wideband filter elements, arranged along the diagonals of the macropixel. The horizontally neighboring macropixels contain green type filter elements, and the next horizontal macropixel contains blue type filter elements. In binning mode, the readout of the pairs of pixels in each macropixel occur together and the pixel values combined. Thus the sensitivity of each binned pixel pair is higher than the sensitivity of each individual pixel of the same type.

Advantageously, since only half the total number of pixel responses needs to be read out from the image sensor, it is possible to achieve double the frame rate while maintaining the same field of view compared to full readout mode of all individual pixels. The disadvantage of operating in the binning mode, however, is reduced spatial resolution.

FIG. 6 shows a further alternative CFA 52. CFA 52 also achieves a 1:1:1 sampling ratio between red, green, and blue pixels that only uses a 6×2 unit cell. The luminance sensitivity curve produced from the RGB pixels of FIG. 6 would match that of FIG. 5 since they have the same density of pixels of each type. As noted, the sensitivity of the Y value computed from the R, G, B pixels of the CFAs of FIGS. 5 and 6 closely tracks that of the W value over the entire wideband filter passband. This advantageously enables the use of the CFAs of FIGS. 5 and 6 to be used in a manner which extends the dynamic range of a luminance image generated using this CFA. Advantageously, a luminance image computed from color filters extends the light response range of an operatively associated image sensor, compared to using only photosites that are spatially correlated with a wideband filter. This is due to photodiodes corresponding to narrowband (color) filters requiring a higher exposure to saturate, compared to photodiodes corresponding to a wideband filter.

In this regard, the CFAs of FIGS. 5 and 6 can be used to generate two luminance images (one from narrowband-filtered pixels and one from wideband filtered pixels), which have different absolute sensitivity across the spectral range, but which have matching spectral sensitivity profiles. This means that in bright conditions, a luminance image can be computed in a manner that is weighted towards the less sensitive luminance image (to avoid saturation), and in low light conditions or high frame rate conditions, a luminance image can be computed in a manner that is weighted towards the high sensitivity luminance image, without causing an appreciable change in color in the resulting image. In some embodiments, it may be possible to switch between the two luminance images or combine them according to requirements.

It should be noted however that the embodiment of FIG. 6 cannot be operated in binning mode, as it does not include pairs of narrowband filters in macropixels as in the embodiment of FIG. 5.

Figure 7:
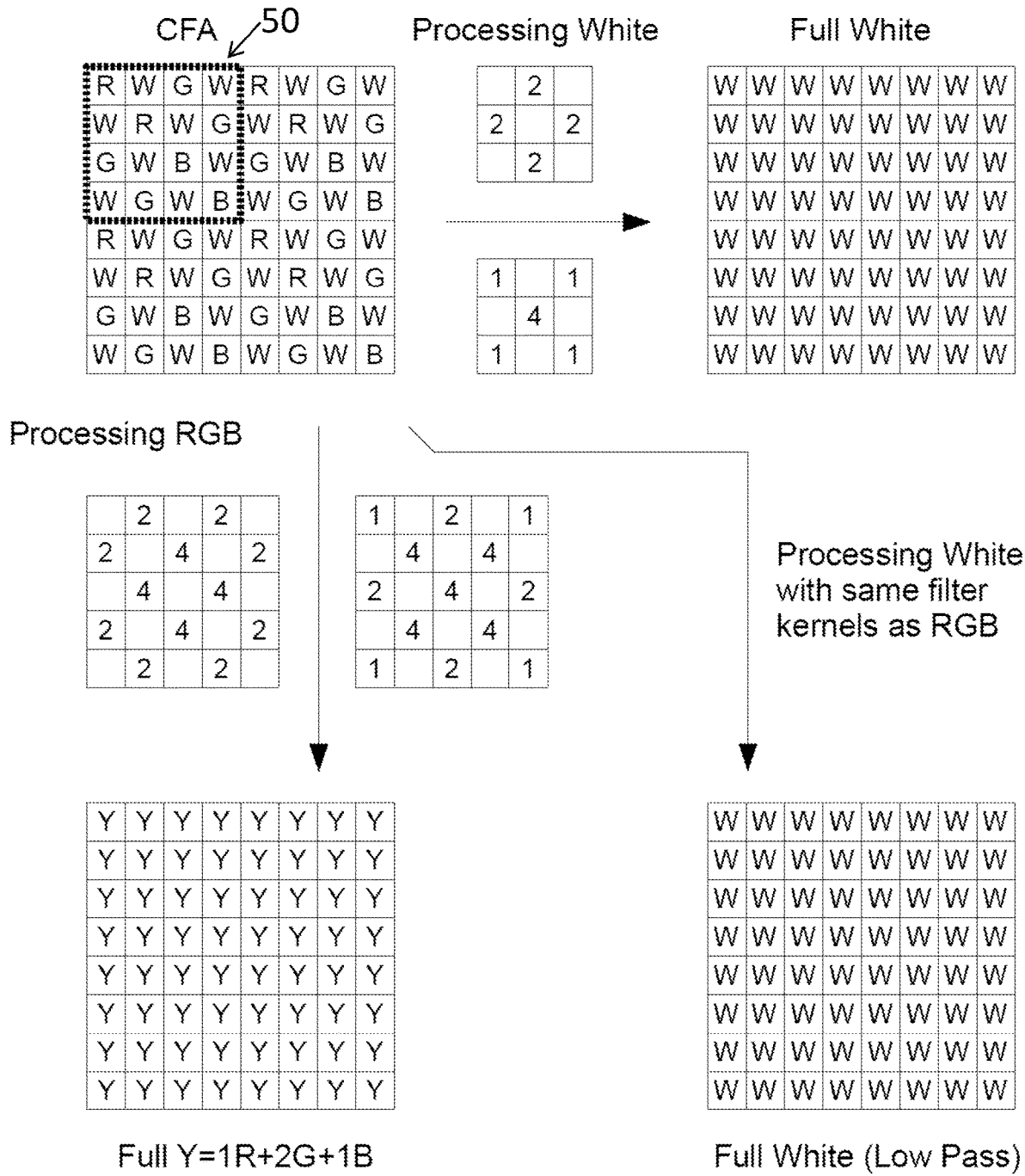
FIG. 7 illustrates the CFA of FIG. 4 having a combination of wideband and three color filter elements. The figure further illustrates the use of a 3×3 filter kernel to derive a full resolution wideband pixel array useable as a luminance image, a 5×5 filter kernel to compute a second luminance image from color photosites, and a low-pass-filtered wideband array from the wideband pixels.
Figure 8:
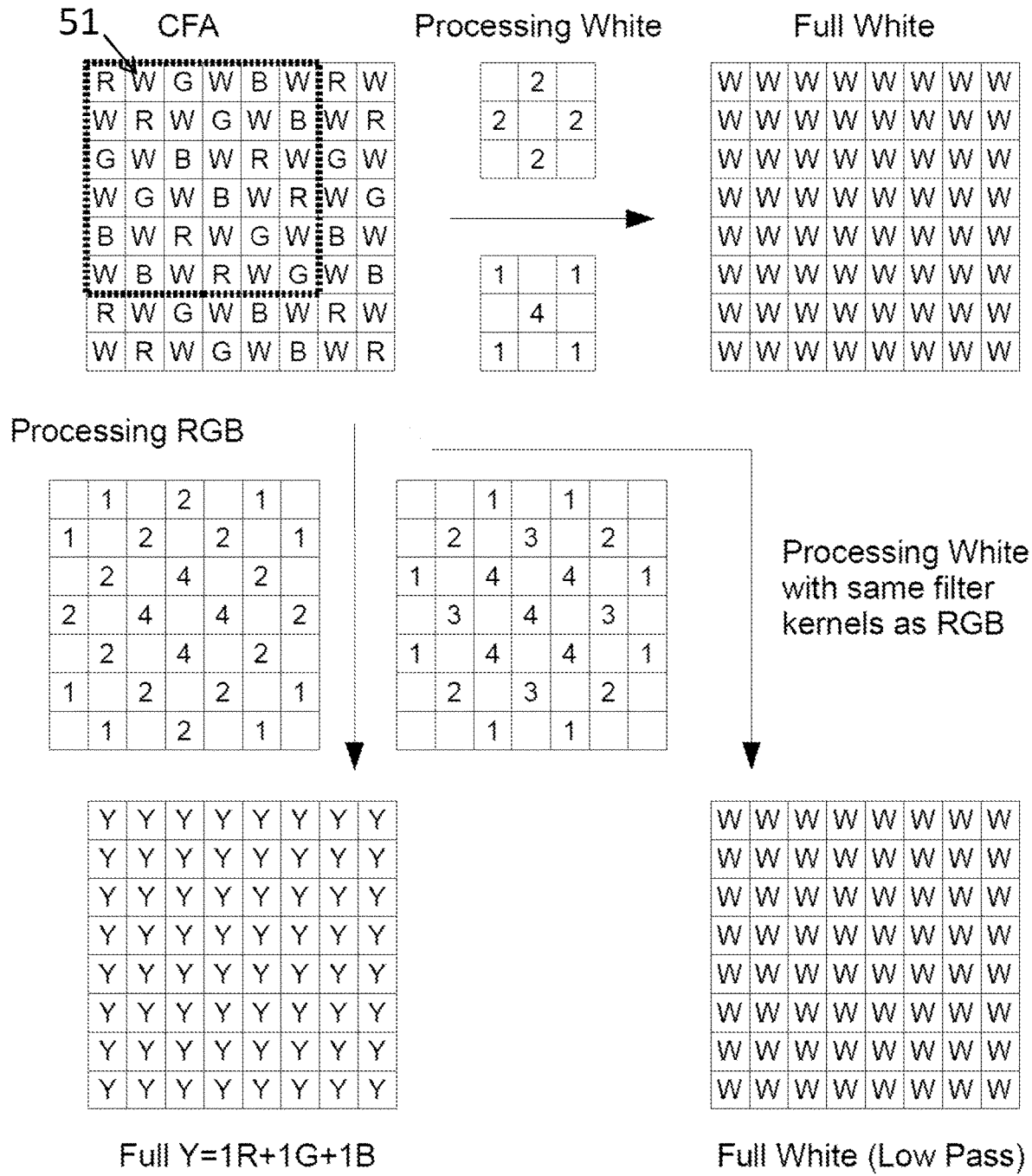
FIG. 8 illustrates the CFA of FIG. 5 and an exemplary set of 3×3 filters to derive a full resolution wideband array and 7×7 filters to compute a luminance signal from its color pixels and a low-pass-filtered wideband image from wideband filtered pixels.
Figure 9:
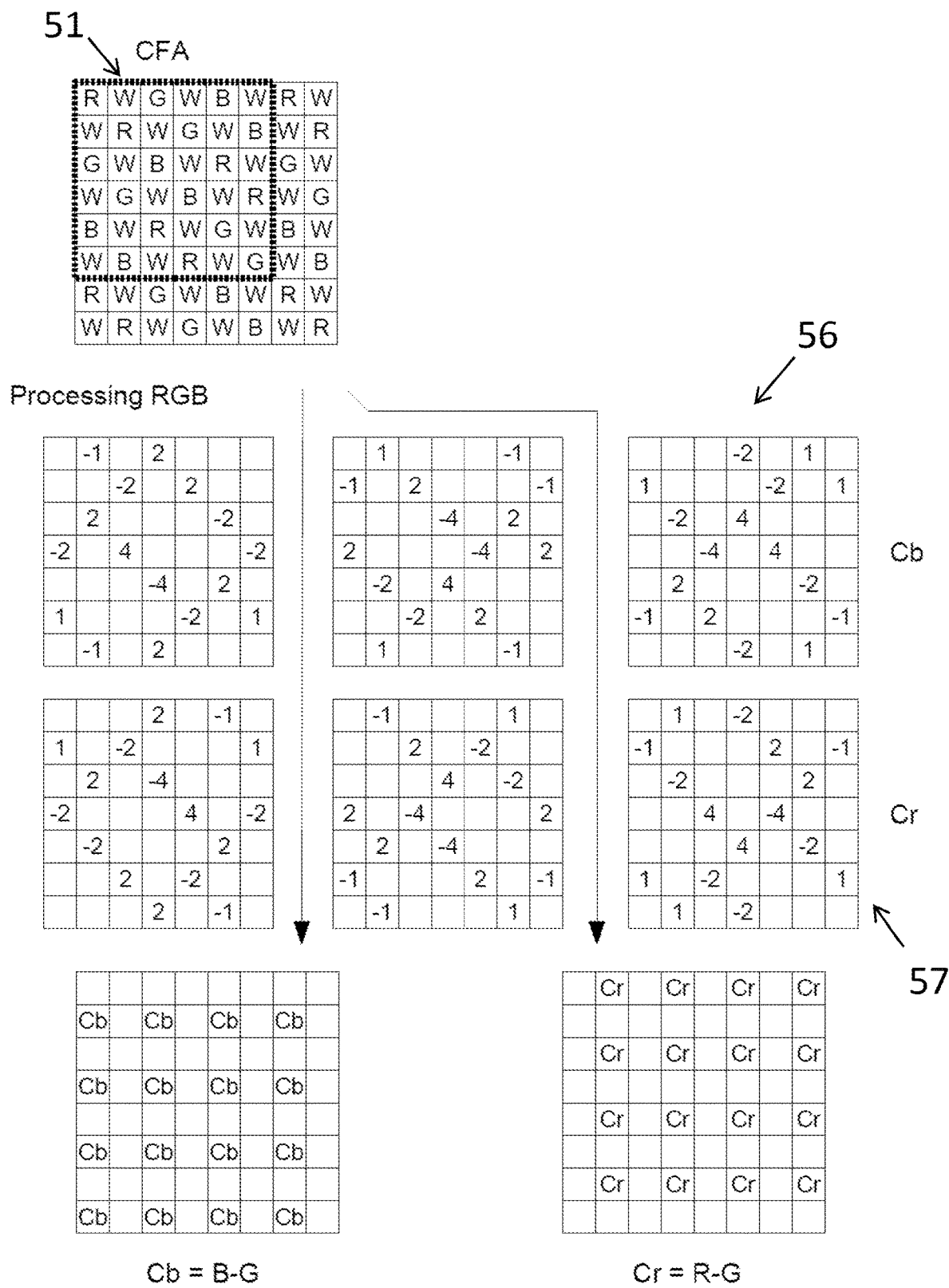
FIG. 9 illustrates the CFA of FIG. 8, and associated filter kernels for generating chrominance images from this CFA.

These advantages will be better appreciated by describing the process for the generation of luminance images using the CFAs of FIGS. 4 and 5. FIGS. 7 and 8 describe mechanisms for generating multiple luminance images from images captured using respective CFAs, whereas FIG. 9 illustrates the generation of chrominance images from an image captured using the CFA of FIG. 5.

FIG. 7 illustrates this process using a known CFA. In this regard, CFA 50 is shown with a 4×4 unit cell, at the unit in the top left. As can be seen, the CFA 50 is the same as that of FIG. 4. From this CFA, a full resolution wideband image can be generated using the pair of 3×3 filters illustrated. The filter kernels illustrated represent the weightings applied to a weighted sum of pixel values covered by the filter. The chosen filter kernels approximate 2-dimensional Gaussian type filters of specific width using simplified coefficients. However, the same method can also be implemented using more complex filters to improve frequency response for a target purpose, e.g., to retain fine image details in the luminance image from the wideband pixels.

For a pixel corresponding to a, R, G, or B pixel, the upper 3×3 filter kernel is used to calculate a wideband pixel value. This is done by combining the horizontally and vertically adjacent wideband pixel values (multiplied by 2 according to the filter kernel presented). For a pixel corresponding to a wideband pixel, the lower 3×3 filter kernel is used. To calculate a wideband pixel value for a "W" pixel, the pixel value (weighted by a factor of 4) is combined with the diagonally adjacent W pixel values to generate a new pixel value. The full resolution wideband image generated in this way represents a high sensitivity luminance image. The image is "high sensitivity" because it is derived from the high sensitive wideband pixel values.

A second high resolution luminance image can be generated from the narrowband (color) pixel values. This is done using the 5×5 filter kernels represented on the central row of FIG. 7. For pixels corresponding to a, R, G, or B value, the rightmost filter kernel is used. As described above, pixel values spatially arranged about the current pixel in the locations represented (with numerical values) in the filter kernel are combined in a weighted sum to generate the pixel value. As can be seen this results in a combination of R, G, B pixels in a 1:2:1 ratio that is more heavily weighted to the immediate neighboring pixels and with weightings progressively dropping off with distance from the pixel. Similarly, for generating values corresponding to a wideband pixel location, the left filter kernel is used. The filter kernel performs a weighted sum of R, G, B pixels surrounding the pixel of interest. Again, this filter kernel generates a pixel value which represents a 1:2:1 combination of R, G, B pixel values.

The resultant image represents a luminance image generated from the color pixel values in the image. Because the R, G, B pixels are filtered, they will not saturate as easily as the wideband pixels, and hence this second luminance image is useful in high light situations. In some embodiments, it may be possible to switch between the two luminance images as the saturation level of the luminance image generated from the wideband pixels approaches saturation. However, in other embodiments, the two luminance images can be used together, e.g., by combining them according to a desired algorithm that blends the luminance image values at intermediate light levels, but transitions to the sole use of one or the other luminance image at high or low light levels. The same 5×5 filter kernels can also be used to generate a low-pass filtered wideband image at full resolution.

The low-pass-filtered wideband array from wideband pixels may achieve lower noise, while maintaining a similar spatial frequency response as a luminance signal calculated from colored photosites. This may simplify the dynamic range extension method of the present disclosure when the wideband pixels are approaching saturation.

As will be appreciated, appropriate demosaicing methods may be used to generate color plane images for R, G, B, and W pixel values separately. Chrominance images can also be generated using suitable filters.

As noted above, an image sensor operatively associated with filter array 50 can also be operated in pixel binning mode by reading the combined charge or voltage of diagonally neighboring photosites. Combining charge or voltage readings in this way has the result of increasing the sensitivity of such 'double pixels', while reducing the total number of pixels requiring readout in comparison to methods involving readout on a full resolution basis. This method of operation effectively doubles the achievable frame rate while maintaining the pixel array at the same optical size.

Maintaining the optical size of the pixel array is advantageous in that that the field of view of the camera does not change.

In addition, the sensitivity ratio between the combined double color and double wideband pixels remains the same as for the single color and wideband pixels in full resolution mode. The same dynamic range extension can also be achieved between combined double color and wideband pixels as for single pixels.

In this regard, FIG. 8 illustrates use of the 6×6 CFA filter of FIG. 5. From this CFA, a full resolution wideband image can be generated using the pair of 3×3 filters illustrated. The filter kernels illustrated represent the weightings applied to a weighted sum of pixel values covered by the filter. As in the previous embodiment, the chosen filter kernels approximate 2-dimensional Gaussian type filters of specific width using simplified coefficients, however other filters could be used if desired.

For a pixel corresponding to a, R, G, or B pixel, the upper 3×3 filter kernel is used to calculate a wideband pixel value. This is done by combining the horizontally and vertically adjacent wideband pixel values (multiplied by 2 according to the filter kernel presented). For a pixel corresponding to a wideband pixel, the lower 3×3 filter kernel is used. To calculate a wideband pixel value for a photosite corresponding to a "W" pixel, the corresponding pixel value (weighted by a factor of 4) is combined with the diagonally adjacent W pixel values, to generate a new pixel value. The full resolution wideband image generated in this way represents a high sensitivity luminance image.

A second high resolution luminance image can be generated from the color pixel values. This is done using the 7×7 filter kernels represented on the central row of FIG. 8. For pixels corresponding to R, G, or B values, the rightmost filter kernel is used. As described above, pixel values spatially arranged about the current pixel in the locations represented (with numerical values) in the filter kernel are combined to generate the pixel value. As can be seen this results in a combination of R, G, B pixels in a 1:1:1 ratio that is more heavily weighted to the immediate neighboring pixels and with weightings progressively dropping off with distance from the pixel. Similarly, for generating values corresponding to a wideband pixel location, the left filter kernel is used. The filter kernel performs a weighted sum of R, G, B pixels surrounding the pixel of interest. Again, this filter kernel generates a pixel value which represents a 1:1:1 combination of R, G, B pixel values.

The resultant image represents a luminance image generated from the color pixel values in the image. Because the R, G, B pixels are filtered, they will not saturate as easily as the wideband pixels, and hence this second luminance image is useful in high light situations. Moreover, as illustrated in relation to FIG. 5, the sensitivity of both luminance images across the spectral range is well matched, so the color sensitivity of the image will be relatively constant regardless of which luminance image is used.

In some embodiments, it may be possible to switch between the two luminance images so calculated at the saturation level of the luminance image generated from the wideband pixels. However, in other embodiments, the two luminance images can be used together, e.g., by combining them according to a desired algorithm that blends the luminance image values at intermediate light levels, but transitions to the sole use of one or the other luminance image at high or low light levels.

Again, a low pass filtered wideband image (at full resolution) can be generated using the 7×7 filters used for calculating the RGB luminance image.

The low-pass-filtered wideband array from wideband pixels may achieve lower noise, while maintaining a similar spatial frequency response as a luminance signal calculated from colored photosites. This may simplify the dynamic range extension method of the present disclosure when the wideband pixels are approaching saturation.

An image sensor operatively associated with filter array 51 can also be operated by reading the combined charge or voltage of diagonally neighboring photosites. Combining charge or voltage readings in this way has the result of increasing the sensitivity of such 'double pixels', while reducing the total number of pixels requiring readout in comparison to methods involving readout on a full resolution basis. This method of operation effectively doubles the achievable frame rate while maintaining the pixel array at the same optical size. Maintaining the optical size of the pixel array is advantageous in that that the field of view of the camera does not change.

In addition, the sensitivity ratio between the combined double color and double wideband pixels remains the same as for the single color and wideband pixels in full resolution mode. The same dynamic range extension can also be achieved between combined double color and wideband pixels as for single pixels. FIG. 9 illustrates a set of filter kernels 56 and 57 that can be used to compute chrominance images from an image captured using the 6×6 CFA of FIG. 5. The chrominance images Cb and Cr are generated at a quarter of the resolution of the full resolution images at the sites indicated. The leftmost chrominance image represents the B-G channel and is created using the 7×7 filter kernels 56 to calculate the appropriate Cb values at a given pixel. For example, in the Cb chrominance image, the Cb value of a white pixel lying in a 2×2 RW, WR macropixel (red macropixel) is generated using the leftmost filter kernel. The Cb image for a white pixel falling on a green macropixel is the center filter kernel and the Cb value of the white pixel falling on a blue macropixel uses the rightmost filter kernel.

The rightmost chrominance image Cr represents the R-G channel and is created using the 7×7 filter kernels 57. For example, in the Cr chrominance image, the Cr value of a white pixel lying in a 2×2 RW, WR macropixel (red macropixel) is generated using the rightmost filter kernel. The Cr value for a white pixel falling on a green macropixel is the center filter kernel, and the Cb value of the white pixel falling on a blue macropixel uses the rightmost filter kernel.

The chrominance images can be used together with the luminance image to store image data in a typical 4:2:0 sampling format (as described in EP 3416128). As noted above, it will typically be advantageous to perform additional processing like white balancing, color transformation, noise reduction, tone mapping, and the like, to generate video output in typical RGB or YUV422 formats for monitoring or streaming (live production).

It will be understood that the disclosure disclosed and defined in this specification extends to all alternative combinations of two or more of the individual features mentioned or evident from the text or drawings. All of these different combinations constitute various alternative aspects of the disclosure.

All of the U.S. patents, U.S. patent application publications, U.S. patent applications, foreign patents, foreign patent applications and non-patent publications referred to in this specification and/or listed in the Application Data Sheet are incorporated herein by reference, in their entirety.

Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A camera, comprising:
   an image sensor configured to receive light and generate image data, the image sensor having an associated filter array and including an array of pixels, each of which corresponds to a filter element in the associated filter array so that each pixel in the array of pixels has a spectral response at least partly defined by a corresponding filter element, the associated filter array including a pattern of wideband filter elements and at least two types of narrowband filter elements; and
   an image processing subsystem comprising one or more data processors, said image processing subsystem being configured to generate a luminance image comprising a wideband filter element value that is calculated for each pixel of the image sensor, the wideband filter element value being calculated by applying a filter kernel to the image data at each said pixel of the image sensor corresponding to either a respective wideband filter element or to a respective narrowband filter element.

2. The camera according to claim 1, wherein the image processing subsystem calculates the wideband filter element value for each said pixel of the image sensor using a filter kernel that combines only image data of other pixels corresponding to the wideband filter elements in the associated filter array.

3. The camera according to claim 2, wherein the image processing subsystem calculates the wideband filter element value for each said pixel of the image sensor using a filter kernel that combines image data of pixels corresponding to the wideband filter elements in the associated filter array that are adjacent to the pixel.

4. The camera according to claim 3, wherein a different filter kernel is applied to the image data of each said pixel of the image sensor depending on whether each said pixel of the image sensor corresponds to a wideband filter element or to a narrowband filter element in the associated filter array.

5. The camera according to claim 3, wherein the filter kernel is, or approximates, a 2-dimensional Gaussian type filter.

6. The camera according to claim 1, wherein the luminance image is a first luminance image, said image processing subsystem is further configured to generate a second luminance image comprising a plurality of narrowband filter element values, the plurality of narrowband filter element values comprising one narrowband filter element value for each said pixel of the image sensor, wherein each narrowband filter element value is calculated using only image data of pixels corresponding to said at least two types of narrowband filter elements in the associated filter array.

7. The camera according to claim 6, wherein said image processing subsystem is further configured to combine the first luminance image with the second luminance image.

8. The camera according to claim 6, wherein said image processing subsystem is further configured to generate a third luminance image comprising a plurality of wideband filter element values, the plurality of wideband filter element values comprising one wideband filter element value for each said pixel of the image sensor, wherein each wideband filter element value of the plurality of wideband filter element values is calculated using only image data of pixels corresponding to wideband filter elements in the associated filter array.

9. The camera according to claim 1, wherein the associated filter array includes three types of narrowband filter elements.

10. The camera according to claim 6, wherein the associated filter array is arranged so that a spectral response of the first luminance image has a profile that substantially matches a profile of the spectral response of the second luminance image.

11. The camera according to claim 7, wherein said image processing subsystem is further configured to select one of the first luminance image and second luminance image for further image processing.

12. The camera of according to claim 11, wherein the combining or selecting is based on any one or more of a: light level; received light level; frame rate; and an exposure time.

13. A camera, comprising:
    an image capture system configured to receive light and generate image data, said image capture system including an image sensor having an associated filter array, said image sensor including an array of pixels, each of which corresponds to a filter element in the associated filter array so that each pixel in the array of pixels has a spectral response at least partly defined by a corresponding filter element, the associated filter array comprising a two-dimensional array of filter elements including one or more repeating unit cells, each repeating unit cell comprising the following filter elements: T1wT2wT3w, wT1wT2wT3, T2wT3wT1w, wT2wT3wT1, T3wT1wT2w, and wT3wT1wT2,
    wherein T1 corresponds to a first type narrowband filter element, w corresponds to a wideband filter element, T2 corresponds to a second type narrowband filter element, and T3 corresponds to a third type narrowband filter element.

14. A camera, comprising:
    an image capture system configured to receive light and generate image data, said image capture system including an image sensor having an array of pixels and a filter array associated with the array of pixels, said filter array comprising a pattern of wideband filter elements and at least three types of narrowband filter elements, said image data including wideband pixel values representing light received at pixels with wideband filter elements and at least three types of narrowband pixel values, each type of narrowband pixel value representing light received at pixels with a corresponding type of narrowband filter element; and
    an image processing subsystem comprising one or more data processors, said image processing subsystem being configured to receive said image data and generate a wideband luminance image from the image data, said wideband luminance image comprising estimated wideband filter element values, each estimated wideband filter element value being calculated by applying a filter kernel to the image data centered at a spatial position in the wideband luminance image corresponding to said estimated wideband filter element value, wherein the spatial position in the wideband luminance image corresponds to a pixel in the image having image data captured using a wideband filter element or to a pixel in the image having image data captured using a narrowband filter element.

15. The camera according to claim 14 wherein said filter kernel used by the image processing subsystem to calculate the estimated wideband filter element value for a pixel in the wideband luminance image uses a subset of the image data for said image, said subset including only image data that are captured by the camera at pixels corresponding to said wideband filter elements.

16. The camera according to claim 15 wherein a different filter kernel is applied to the image data depending on whether the spatial position of the estimated wideband filter element value in the wideband luminance image corresponds to a pixel of the image data captured using a wideband filter element or to a pixel of the image data captured using a narrowband filter element.

17. The camera according to claim 14 wherein the image processing subsystem is further configured to generate a narrowband luminance image comprising estimated narrowband filter element values, each estimated narrowband filter element value being calculated by applying a filter kernel to the image data at a spatial position corresponding to said estimated narrowband filter element value, wherein the filter kernel calculates the estimated narrowband filter element value using a subset of the image data for said image, said subset including only image data that are captured by the camera at pixels corresponding to said narrowband filter elements.

18. The camera according to claim 17 wherein the image processing subsystem is further configured to generate a second wideband luminance image comprising estimated second wideband filter element values, each estimated second wideband filter element value being calculated by applying a filter kernel to the image data at a spatial position corresponding to said estimated second wideband filter element value, wherein the filter kernel calculates the estimated second wideband filter element value using a second subset of the image data for said image, said second subset including only image data that are captured by the camera at pixels corresponding to said wideband filter elements.

19. The camera according to of claim 14 wherein the image processing subsystem is further configured to generate:
a lowpass filtered narrowband luminance image comprising only estimated lowpass-filtered narrowband filter element values, each estimated lowpass-filtered narrowband filter element value being calculated using a subset of the image data for said image, said subset including only image data that are captured by the camera at pixels corresponding to one of said at least three types of narrowband filter elements; and
a lowpass filtered wideband luminance image comprising only estimated lowpass-filtered wideband filter element values, each estimated lowpass-filtered wideband filter element value being calculated using a second subset of the image data for said image, said second subset including only image data that are captured by the camera at pixels corresponding to said wideband filter elements.

20. The camera according to claim 19 wherein the estimated lowpass-filtered narrowband filter element values and estimated lowpass-filtered wideband filter element values are calculated using common filter kernels.

21. The camera according to claim 20 wherein a different filter kernel is applied to the image data depending on whether a spatial position of an estimated value in the respective lowpass filtered narrowband luminance image or lowpass filtered wideband luminance image corresponds to a pixel of image data captured using a wideband filter element or to a pixel of image data captured using one of said at least three types of narrowband filter elements.

22. The camera according to claim 21 wherein the image processing subsystem is further configured to:
use a first filter kernel to calculate an estimated lowpass-filtered narrowband filter element value if the spatial position of the estimated lowpass-filtered narrowband filter element value corresponds to one of said at least three types of narrowband filter elements;
use a second filter kernel to calculate an estimated lowpass-filtered narrowband filter element value if the spatial position of the estimated lowpass-filtered narrowband filter element value corresponds to a wideband filter element;
use said first filter kernel to calculate an estimated lowpass-filtered wideband filter element value if the spatial position of the estimated lowpass-filtered wideband filter element value corresponds to a wideband filter element; and
use said second filter kernel to calculate an estimated lowpass-filtered wideband filter element value if the spatial position of the estimated lowpass-filtered wideband filter element value corresponds to one of said at least three types of narrowband filter elements.

23. The camera according to claim 14 wherein said filter kernel is, or approximates, a 2-dimensional Gaussian type filter.

24. The camera according to claim 18 wherein the second wideband luminance image and the narrowband luminance image have a same spatial frequency response.

25. A camera, comprising:
an image capture system configured to receive light and generate image data representing an image, said image capture system including an image sensor and a color filter array comprising a pattern of wideband filter elements, red filter elements, green filter elements, and blue filter elements;
an image processing subsystem comprising one or more data processors, said image processing subsystem being configured to:
generate a wideband luminance image from the image data, said wideband luminance image comprising an estimated wideband filter element value for each pixel of the wideband luminance image that is calculated using a first subset of the image data for said image, said first subset including only image data corresponding to said wideband filter elements;
generate a narrowband luminance image from the image data, said narrowband luminance image comprising an estimated narrowband filter element value for each pixel of the narrowband luminance image that is calculated using a second subset of the image data for said image, said second subset including only image data corresponding to said red, green, and blue filter elements; and
generate a lowpass-filtered wideband luminance image from the image data, said lowpass-filtered wideband luminance image comprising an estimated lowpass-filtered wideband filter element value for each pixel of the lowpass-filtered wideband luminance image that are calculated using a third subset of the image data for said image, said third subset including only image data corresponding to said wideband filter elements.

26. The camera according to claim 25 wherein the image processing subsystem is configured to generate each of the wideband luminance image, the narrowband luminance image, and the lowpass-filtered wideband luminance image directly from the image data without demosaicing.

27. The camera according to claim 26 wherein the image processing subsystem is configured to calculate each estimated wideband filter element value by applying a filter kernel of a first set of filter kernels to said image data, wherein the applied filter kernel is determined according to a spatial position of the estimated wideband filter element value in the wideband luminance image.

28. The camera according to claim 27 wherein the image processing subsystem is configured to calculate each estimated narrowband filter element value by applying a filter kernel of a second set of filter kernels to the image data, wherein the applied filter kernel is determined according to a spatial position of the estimated narrowband filter element value in the narrowband luminance image.

29. The camera according to claim 26 wherein each of the wideband luminance image, the narrowband luminance image, and the lowpass-filtered wideband luminance image is generated directly from the image data using one or more filter kernels that is, or that approximates, a 2-dimensional Gaussian type filter.

\* \* \* \* \*